United States Patent [19]

Morimoto et al.

[11] Patent Number: 4,904,127
[45] Date of Patent: Feb. 27, 1990

[54] HIGH-DENSITY PNEUMATIC TRANSPORT METHOD FOR USE IN POWDERED OR GRANULAR MATERIALS AND SYSTEM FOR PRACTISING THE METHOD

[75] Inventors: Kiyoshi Morimoto; Akikazu Iwamoto; Masuo Moriyama, all of Shizuoka; Junji Nakagawa, Osaka, all of Japan

[73] Assignees: Kyowa Hakko Kogyo Co., Ltd., Tokyo; Kabushiki Kaisha Matsui Seisakusho, Osaka, both of Japan

[21] Appl. No.: 209,122

[22] Filed: Jun. 20, 1988

[30] Foreign Application Priority Data

Jun. 22, 1987 [JP] Japan ................................ 62-154921

[51] Int. Cl.⁴ ..................... B65G 53/66; B65G 53/04; B65G 53/52; B65G 53/34
[52] U.S. Cl. ......................................... 406/50; 406/49; 406/24; 406/25; 406/32; 406/19; 406/21; 406/36; 406/84; 406/195; 406/194; 406/85
[58] Field of Search .............................. 406/21, 23–25, 406/32, 36, 37, 49, 50, 83, 124, 144, 190, 192, 194, 195, 197, 84

[56] References Cited

U.S. PATENT DOCUMENTS

| | | | |
|---|---|---|---|
| 1,932,497 | 10/1933 | Wellensiek | 406/50 X |
| 3,419,209 | 12/1968 | Munn | 406/49 X |
| 4,106,817 | 8/1978 | Tsuzuku et al. | 406/49 |

FOREIGN PATENT DOCUMENTS

| | | | |
|---|---|---|---|
| 268101 | 5/1988 | European Pat. Off. | 406/195 |
| 269250 | 6/1988 | European Pat. Off. | 406/50 |
| 296803 | 12/1988 | European Pat. Off. | 406/195 |
| 2622073 | 7/1977 | Fed. Rep. of Germany | 406/24 |
| 264122 | 11/1987 | Japan | 406/83 |
| 264124 | 11/1987 | Japan | 406/50 |
| 280125 | 12/1987 | Japan | 406/50 |
| 71021 | 3/1988 | Japan | 406/24 |
| 106230 | 5/1988 | Japan | 406/83 |
| 106231 | 5/1988 | Japan | 406/50 |

Primary Examiner—Joseph F. Peters, Jr.
Assistant Examiner—James M. Kannofsky
Attorney, Agent, or Firm—Jones, Tullar & Cooper

[57] ABSTRACT

An improved method and related system for pneumatically transporting powdered or granular materials stored in an airtight storage container to a collector through a transport pipe in the form of a lengthy column in high density and at a slow speed by the use of pressurized gas. The method of the invention comprises the steps of stopping feeding of the pressurized gas when the whole of the powdered or granular materials corresponding to a final batch contained in the storage container are sent into the material transport pipe, simultaneously discharging the internal pressure of the storage container through a gas decompressing means, inserting a transport plug from the base end of the material transport pipe, and carrying forward the transport plug at a slow speed by feeding pressurized gas from the base end of the transport pipe.

2 Claims, 12 Drawing Sheets

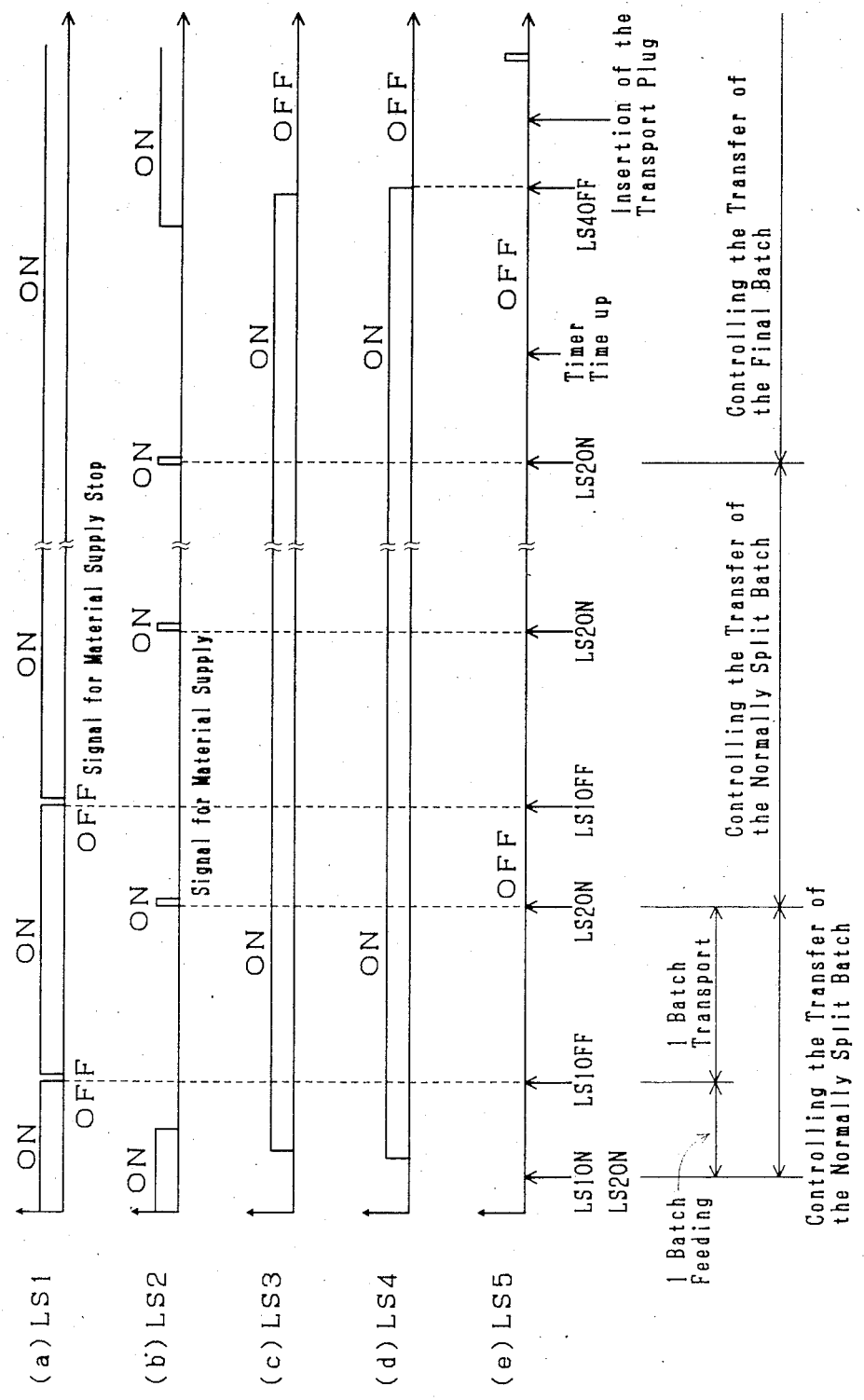

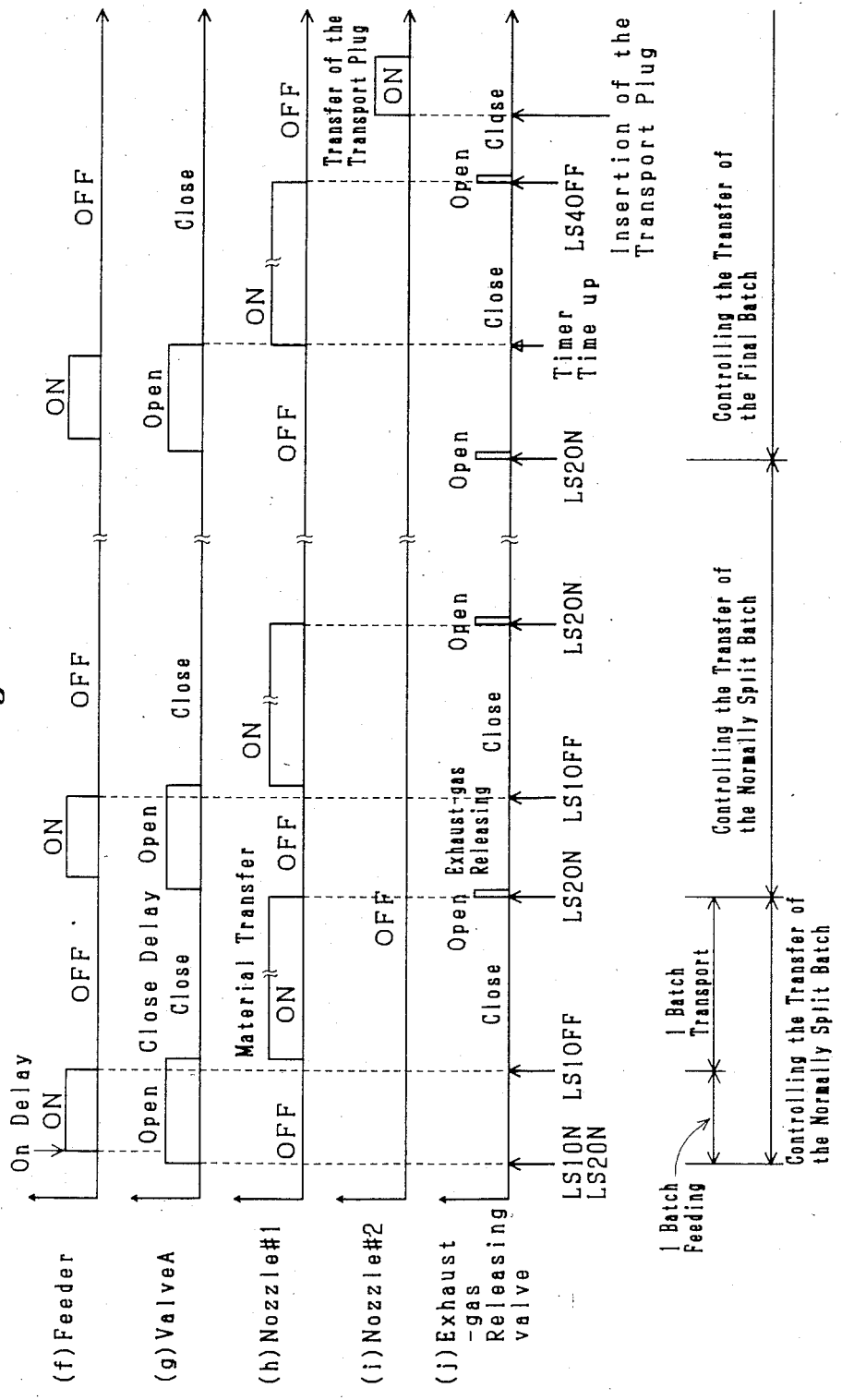

HIGH-DENSITY PNEUMATIC TRANSPORT METHOD FOR USE IN POWDERED OR GRANULAR MATERIALS AND SYSTEM FOR PRACTISING THE METHOD

BACKGROUND OF THE INVENTION

I. Field of the Invention

The present invention relates to an improved method and the related system for pneumatically transporting powdered or granular materials stored in an air-tight storage container to a collector through a transport pipe in high density and at a slow speed by applying pressurized gas.

II. Prior Art

FIG. 10 shows a pneumatic transport system for use with powdered or granular materials which is of a general type conventionally used.

The system is constructed such that powdered or granular materials stored in an airtight storage container 100 are fed from the container 100 to a lower pipe 102a of a transport pipe 102 by the gas supplied from a gas feed pipe 101, and the materials are formed into a plug 105 (FIG. 11) by applying pressurized gas intermittently from a pressure nozzle 103 disposed in the half way of the lower pipe 102a, and then the plug is pneumatically transported in an upper pipe 102c of the transport pipe 102 through an inclined pipe 102b and are finally received by a collector 104.

However, when the powdered or granular materials are pneumatically transported in the form of a plug by the system described above, clearance is often generated above the plug while it passes through the transport pipe 102 as shown in FIG. 11, with the result that powdered or granular materials 106 on the surface of the plug 105 are first transferred and the plug would be early broken, thus eventually resulting in segregation.

Furthermore, since any of those conventional feeding systems delivers the plug at an extremely fast speed like several meters per second for example, the plug would be obliged to incur strong shock when being caught by collector 104, thus easily incurring chipping or breakage.

As a result, when such a conventional system is used for transporting medicine materials such as tablets requiring protection of finest quality from even the slightest crack, chipping, and breakage, the rate of producing inferior goods increases, and thus, actually, any of those conventional systems cannot have been used for transporting medicine materials up to now.

After following up research and tests time and again for completely solving those problems inherent in the conventional system mentioned above, the present invention resulted.

A method and the related system for pneumatically transporting powdered or granular materials in the form of a lengthy column in high density and at a slow speed was disclosed in Japanese Patent Application No. 61-251172(1986).

However, this prior invention needs insertion operation of a specified transport plug into the material transport pipe at a specific timing while pneumatically transporting powdered or granular materials in the transport pipe by applying pressurized gas. This in turn obliges the system related to the prior invention to constantly follow up troublesome timing control operations. In addition, when powdered or granular materials corresponding to the final batch are pneumatically transported in the transport pipe, pressurized gas charged both in the transport pipe and in the airtight storage container either would be forcibly discharged through the space generated above the materials in the transport pipe, thus causing part of the materials in the transport pipe to remain there, or would forcibly discharge the materials from the pipe due to "blow-out phenomenon", eventually incurring strong shock. Therefore, it leaves some room for improvement to the prior invention described above.

FIG. 12 illustrates variations of the internal pressure P and wind volume Q inside of the airtight storage container while the materials are pneumatically transported by means of pressurized gas.

It should be noted that since the pressurized gas charged in the airtight storage container is quickly discharged when the remaining materials corresponding to final batch pass through the material transport pipe, wind volume Q suddenly increases to easily cause the "blow out phenomenon".

SUMMARY OF THE INVENTION

Accordingly, it is the primary object of the invention to provide an improved method for pneumatically transporting powdered or granular materials at slow speed and at a high density by applying easily operative control means without incurring the "blow out phenomenon" even when completing pneumatically transporting powdered or granular materials.

Another object of the invention is to provide a system for practising the method.

The foregoing objects are accomplished by providing the present method which pneumatically transports powdered or granular materials stored in an airtight storage container to a collector through a transport pipe by the use of pressurized gas comprising the steps of sequentially feeding a predetermined amount of powdered or granular materials fed from a material supply station into the airtight storage container while splitting the materials into a plurality of batches which are composed of a plurality of normal batches and one final batch; feeding pressurized gas into the storage container maintaining airtight condition so as to send the materials contained in the storage container into the transport pipe; stopping feeding of the pressurized gas when the whole of powdered or granular materials corresponding to a final batch contained in the storage container are sent into the material transport pipe; simultaneously discharging the internal pressure of the storage container through a gas decompressing means; inserting a transport plug from the base end of the material transport pipe into the transport pipe; and carrying forward the transport plug at a slow speed together with the materials remaining in the transport pipe to the collector through the transport pipe by feeding pressurized gas from the base end of the transport pipe into the transport pipe.

On the other hand, a high density pneumatic transport system of the invention for pneumatically transporting powdered or granular materials comprises: an airtight storage container provided with a pair of sensors, one of the sensors being adapted to detect the upper limit level of the materials contained in the storage container, and other of the sensors being adapted to detect the lower limit level of the materials contained in the storage container; a material feeding means for sequentially feeding the materials from a material supply station into the storage container while splitting the materials into a plurality of batches; a collector for receiving said material connected to said storage container through a material transport pipe; a pair of sensors for detecting the existence of the materials contained in the storage container, one of the sensors being installed to position below the lower limit level, and the other of the sensors being installed to position at the base end of the material transport pipe close to the outlet of the storage container; a transport plug adapted to be in close contact with the inner surface of said material transport pipe and being inserted into the base end of the material transport pipe; a decompressing means for discharging pressurized gas charged in the storage container; a gas supplying means for feeding pressurized gas into the base end of the material transport pipe so as to pneumatically transport the material sent into the transport pipe and to carry forward the transport plug; and a controller unit for controlling the gas supply means, material supply means, and the gas decompression means in response to detection signals from the sensors.

BRIEF DESCRIPTION OF THE DRAWINGS

A description will now be given of a preferred embodiment of the invention with reference to the accompanying drawings wherein;

FIG. 3 illustrates the condition of plug during transit through a horizontal upper pipe;

FIGS. 7a, 7b are respectively the timing charts explaining the operative relationship between sensors and external system constituents when executing the method of the invention;

DETAILED DESCRIPTION OF A PREFERRED EMBODIMENT OF THE INVENTION

Figure 1:
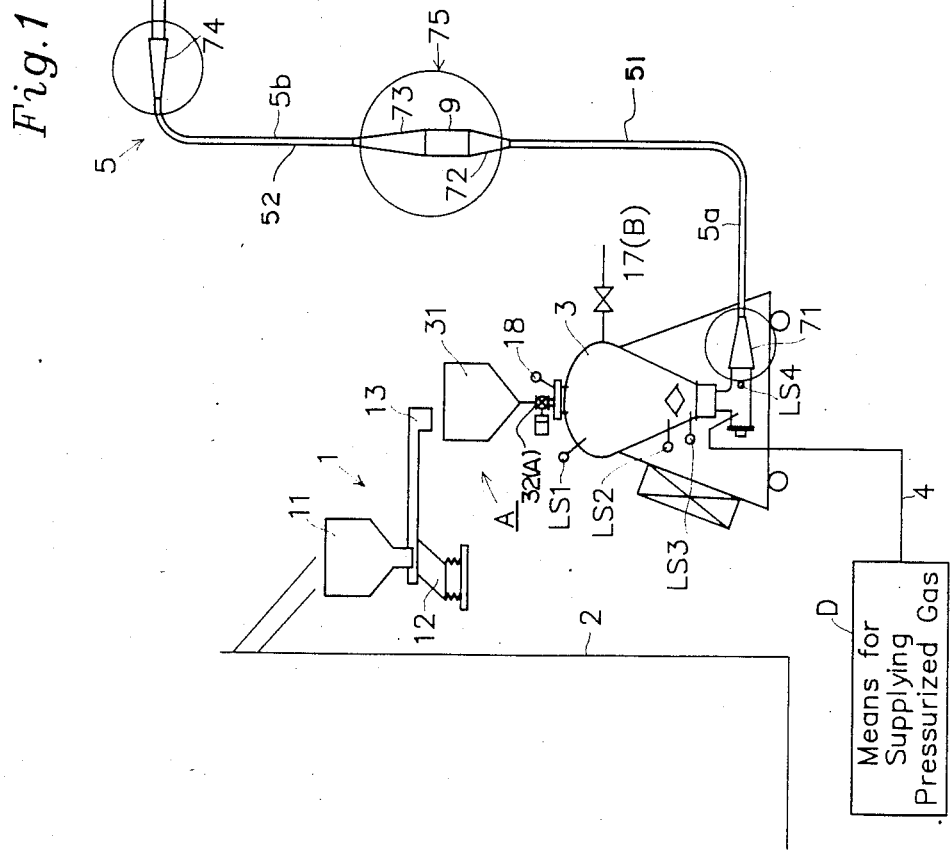
FIG. 1 is a schematic block diagram of a preferred embodiment of the system of the invention.

Referring now more particularly to the accompanying drawings, a description will be now given of one preferred embodiment of the invention FIG. 1 shows a simplified schematic diagram of the pneumatically transporting system by applying the method related to the invention to the transporting of medicine tablets for example.

The numeral 1 designates a tablet feeder constituting a material feeding means. A hopper 11 of the feeder 1 stores tablets manufactured by and delivered from a tablet molding machine 2 which constitutes a material supply station in this embodiment of the invention. These tablets are produced on the basis of one production lot comprised of about one million tablets.

In the embodiment of the invention shown in FIG. 1, when a valve 32 provided at the upper inlet of the airtight storage container 3 is opened and then an electromagnetic vibrator 12 of the feeder 1 is driven in order to vibrate a trough 13, a specific amount of tablets split into a plurality of batches from one lot is delivered to the hopper 31 of the airtight storage container 3 through the trough 13 and is fed into the airtight storage container 3.

In that feeding process, since one-lot-basis tablets are usually delivered by being split into a plurality of batches, the amount of the material corresponding to the final batch tablets will be generally less than that of the materials corresponding to proceeding normal batches.

It should be noted that this preferred embodiment of the invention includes material feeding means A comprising the electromagnetic vibrator 12 and the valve 32. The airtight storage container 3 itself has a construction sufficiently durable to pressure and is provided with level detection sensors LS1 and LS2 so as to detect the upper and lower limit levels of the contained material therein.

Accordingly, when the amount of the material contained in the storage container 3 is below the lower limit level during pneumatic transport as will be described hereinafter, the lower level detection sensor LS2 turns ON, whereas when the amount of the material contained in the storage container 3 reaches the upper limit level, the upper limit level detection sensor LS1 turns OFF.

Figure 6:
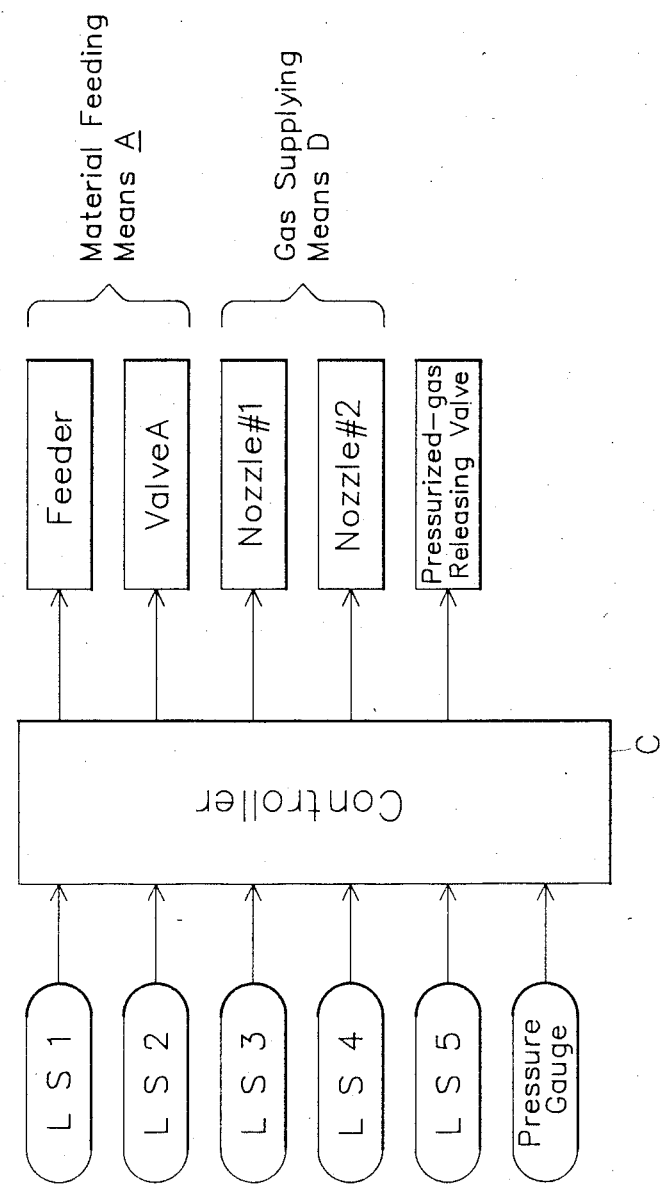
FIG. 6 is a simplified schematic diagram of the control system employed in the invention.

The controller unit C shown in FIG. 6 detects ON/OFF signals from these sensors LS1 and LS2, and then, in response to the detected signal, the controller C properly governs the supply of material by causing the valve 32 to open or close and causing the vibrator 12 of the feeder 1 to drive or stop. In addition, the system described in FIG. 1 provides an exhaust-gas releasing valve 17 at an adequate position of the storage container 3 to exhaust excessive pressurized gas charged in the storage container 3 when required. Control of the opening and closing of the valve 32 is executed in conjunction with the driving operation of the electromagnetic vibrator 12. Namely, the controller unit C activates the electromagnetic vibration 12 only after assuring the opening operation of valve 32 so that the required material can be securely supplied, whereas the controller unit C closes the valve 32 only after assuring the stopping operation of valve 32 so that unnecessary retention of tablets in the valve 32 ("biting") can securely be prevented when stopping the supply of these tablets.

A material transport pipe 5 extends from the outlet 3a provided below the air-tight storage container 3 to a collector 6.

Figure 2:
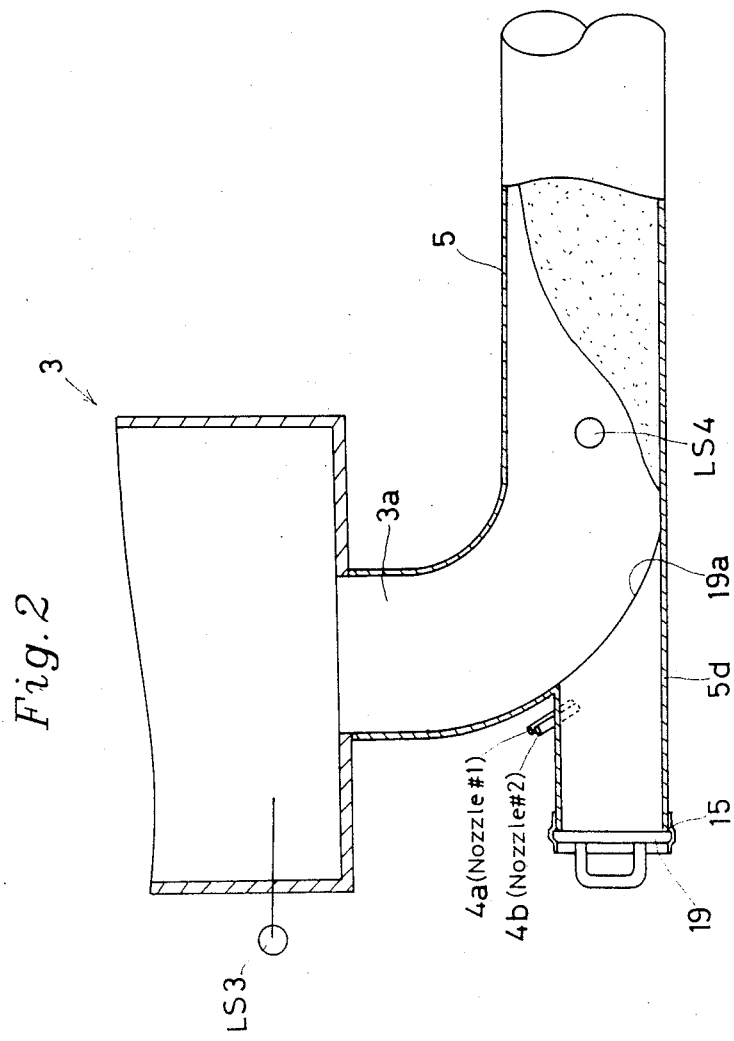
FIG. 2 illustrates the construction of the material transport pipe which allows insertion of the transport plug thereinto, while also illustrating a broken part of the bottom of the storage container.

As shown in FIG. 2, the base end of the material transport pipe 5 is provided with a projection 5d with an opening 19a for allowing insertion of a transport plug 14 thereinto, the opening 19a has a curved portion to communicate with an opening of the transport pipes 5, and a lid plug 19 is installed at the open end of the projection 5d with a connecting band 15.

A pair of nozzles 4a and 4b for feeding pressurized gas are respectively provided in adequate positions of the projection 5d lower than the outlet 3a of the storage container 3 connected to the material transport pipe 5. These nozzles 4a and 4b are respectively connected to the pneumatic source comprised of a gas supply means D through gas supply tube 4 (see FIG. 1). Nozzle 4a is used when pneumatically delivering tablets for example, whereas nozzle 4b is used when pneumatically delivering the transport plug 14 which will be described later.

Sensor LS3 is provided below the lower limit detection sensor LS2 of the storage container 3, whereas sensor LS4 is provided at an adequate position of the base of the material transport pipe 5 close to the outlet 3a of the storage container 3 so as to detect the existence of the material to be pneumatically transported. In particular, sensor LS4 is installed at the position where the detection point of the sensor LS4 is disposed at approximately interim height of the material transport pipe 5.

A description will now be further given of the construction of the material transport pipe in detail.

The transport pipe 5 includes a horizontal lower pipe 5a connected to the delivery outlet 3a at the lower end of the container 3, a horizontal upper pipe 5c connected to the upper end inlet of a collector 6, and a vertical riser pipe 5b connecting the pipe 5a to the pipe 5c. The vertical riser pipe 5b includes two vertical straight pipes 51,52 each of which is connected to a horizontal lower pipe 5a, a horizontal upper piper 5c respective and a composite reducer 75.

The composite reducer 75 is composed of the combination of a divergent cylinder reducer 72 constituting a decelerating reducer and a convergent cylinder reducer 73 constituting an accelerating reducer. In addition, a convergent cylinder reducer 71 constituting an accelerating reducer 71 is disposed intermediately of the lower pipe 5a, and a divergent cylinder reducer 74 constituting a decelerating reducer is disposed at the initial end of the horizontal pipe 5c.

In the embodiment described above, a sight glass 9 for watching how the powdered or granular materials are transferred in the vertical riser pipe 5b is also provided between the reducer 72 and the reducer 73 constituting the composite reducer 75. The horizontal upper pipe 5c is provided with a specific inner diameter which is the same as in all parts, whereas the end of pipe 5c is provided with a decelerating elbow pipe 8 having an enlarged caliber larger than that of the horizontal pipe 5c which is connected to the collector 6.

It should be noted that the construction of the material transport pipe 5 mentioned above was already proposed by the Applicant of the present invention. The construction of the present invention was introduced in order to pneumatically transport powdered or granular materials in high density and at a slow speed by forming the material into a lengthy column while passing through the horizontally disposed pipe without using a transport plug.

Namely, in the proposed system for pneumatically transporting powdered or granular materials without using a transport plug mention above, powdered or granular materials taken out of the airtight storage container 3 by applying pressurized gas reaches the horizontal upper pipe after passing through a horizontal lower pipe 5a and the vertical rising pipe 5b having composite reducer 75 and is then formed into a lengthy column P as shown in FIG. 3. As a result, the materials are pneumatically transferred in the form of a long column and at a very slow speed through the horizontal upper pipe 5c and further decelerated by the elbow 8 with an enlarged caliber at the terminal end of the pipe 5c. As a result, the materials finally drop into the collector 6 in the form of free fall.

Sensor LS5 is installed at the end of the material transport pipe 5 for detecting the passage of the transport plug. For this propose, the sensor LS5 needs to discern between the transferred materials and the transport plug. However, this will be easily achieved by using a color-sensitive sensor in order that it can correctly discern a specific color of the transport plug from that of the transferred materials.

It is also possible for the system related to the invention to provide a pressure sensor detecting variation of the pressure inside of the storage container in place of sensor LS5 mentioned above to allow the controller unit to assure that the transport plug 14 is drawn out of the material transport pipe 5 by detecting the change pressure with the pressure sensor.

In addition, another variety of methods will be available for detecting the transport plug 14.

According to the system of the invention, the objective materials are securely pneumatically transported at an extremely slow speed like 0.3 through 0.5 meters per second for example, the material transporting operation can smoothly be done without incurring shock to the objective material and without causing segregation, thus eventually preventing the objective materials from either being cracked or chipped during pneumatic transport operations.

Figure 4A:
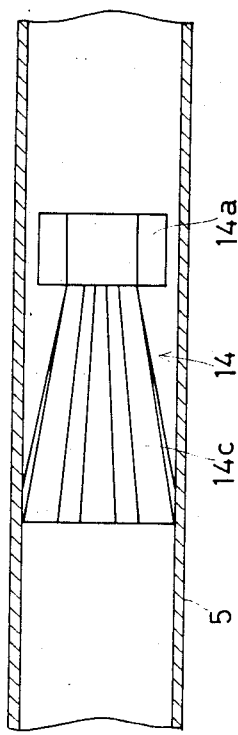
FIGS. 4 (a) through (c) illustrate respectively the embodiments of the transport plugs employed in the invention.
Figure 4B:
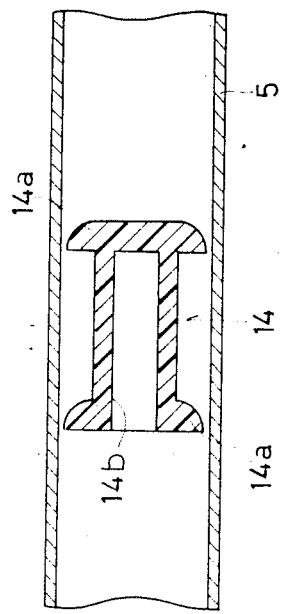
Figure 4C:
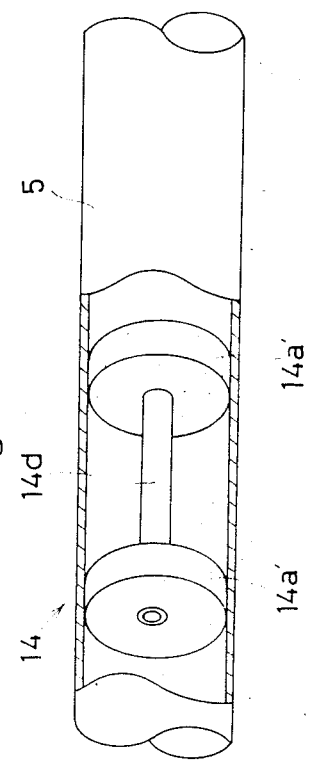

FIG. 4 (a) through (c) respectively illustrate embodiments of the transport plug 14 employed in the system for pneumatically transporting powder or granular material related to the invention.

FIG. 4 (a) illustrates a transport plug with an ear plug like shape moving forward on receipt of pressurized gas through the hollow portion 14b.

FIG. 4 (b) illustrates another transport plug with the shape of a shuttlecock of badminton. The plug has a number of feathers 14c capable of freely opening and closing themselves on receipt of pressurized gas, while these feathers 14c are respectively radially installed behind the plug portion 14a.

Including those which are shown in FIG. 4 (a) and (b), in order to thoroughly carry forward powdered or granular materials remaining inside of the material transport pipe 5, the transport plug 14 is essentially provided with a specific structure having the plug portion 14a which is closely in contact with the inner surface of the material transport pipe 5.

Considering the case in which the inner diameters of the material transport pipe 5 may be different from each other depending on the construction of transport pipes used for pneumatically transporting the materials, it is desired to provide a transport plug 14 with an elastic plug portion 14a capable of constantly and tightly coming into contact with the inner surface of the material transport pipe 5, and yet, elastic plug portion 14a will preferably allow adequate leakage of pressurized gas so that it can be carried forward inside of the material transport pipe 5 at an extremely slow speed when being driven by pressurized gas.

FIG. 4 (c) illustrates an embodiment of the transport plug 14 satisfying the requirements mentioned above, where the transport plug 14 is comprised of plug portion 14a' and 14a' which are integrally connected to each other via a shaft 14d, and both of these are made from foamed soft material, respectively.

Further, a description will be given of the method of the invention. FIG. 6 is the simplified schematic diagram of the control system employed in the system of the invention. The controller unit C which is typically comprised of a programmed controller for example, which sequentially executes those operations described below.

On receipt of the material-detected signals from sensors LS1 through LS5 and after reading out the pressure level of the pressure gauge 18 (shown in FIG. 1) provided for the airtight storage container 3, the controller unit C then controls ON/OFF operations of external equipment including feeder 1, valve 32, nozzles Nos. 1 and 2, and pressurized gas releasing valve 17 in order to properly control the supply of objective materials, transporting of normally split batch materials, and transporting of the final-batch materials.

To simplify the explanation on the control operations, the description refers to "material feeding means A" signifying feeder (reference numeral 1 in FIG. 1) and valve A (reference numeral 32 in FIG. 1), exhaust gas decompressing means B signifying pressurized gas releasing means (reference numeral 17 in FIG. 1), and gas supplying means D denoting nozzles Nos. 1 and 2 (reference numerals 4a and 4b in FIG. 2), respectively.

FIG. 7a, 7b are the timing charts explaining the control operations for the feeder 1, valve A, nozzles Nos. 1 and 2 in conjunction with signals detected by sensors LS1 through LS5.

Figure 8A:
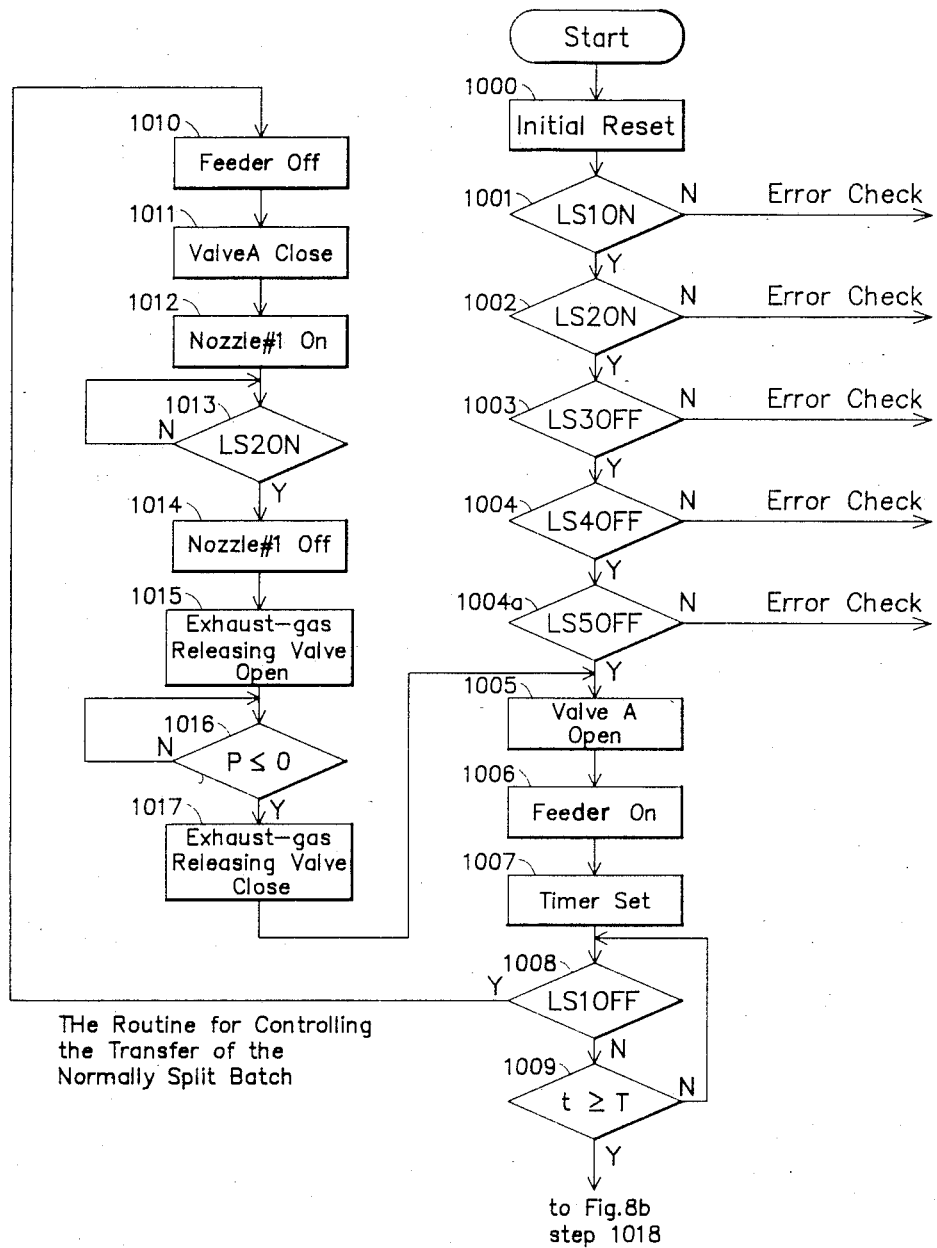
FIGS. 8a, 8b are respectively the operation flowcharts explaining sequential steps of the control operations related to the method of the invention.
Figure 8B:
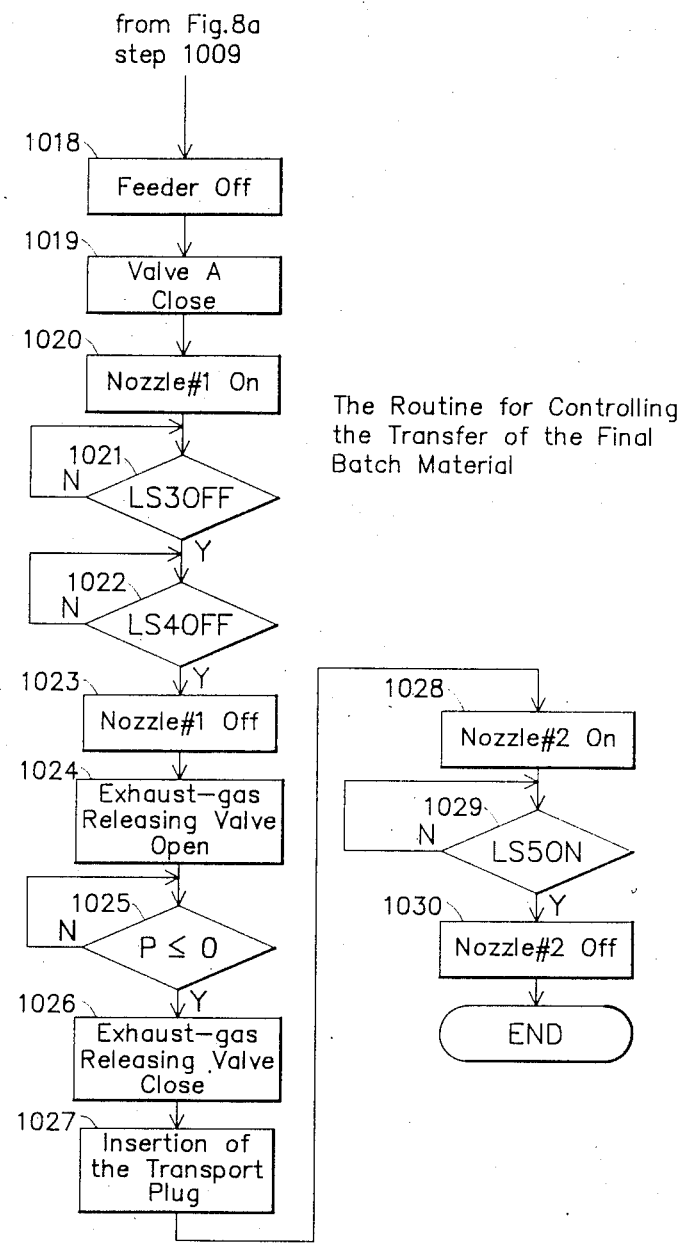

FIG. 8a, 8b are the operation flowchart denoting these control operations.

Referring now more particularly to FIGS. 7 and 8, further detail of the system control operations executed in the invention is described below.

As soon as the prepared program execution is started, the control system operations are reset to return to the initial condition. This corresponds to step 1000, in which the controller unit C resets the operations of the external equipment.

Next, when steps 1001 through 1004 are entered, the controller unit C checks the signals from sensors LS1 through LS5 to assure if any abnormal condition is present in the system, or not.

When all the signals detected by sensors LS1 through LS5 are determined to be normal, step 1004 is entered to open valve A, and then the controller unit C turns the feeder 1 ON in step 1006, and then, allows the feeder 1 to commence feeding of tablets for delivery to the airtight storage container 3. Checking of sensors LS3 through LS5 may be deleted if required.

When the feeder 1 is activated, the operation mode enters step 1007 to set the timer which governs the time needed for monitoring the condition of sensor LS1 after activating the feeder 1. If sensor LS1 does not turn OFF before the timer counts up the set period, the controller unit C then decides that the objective materials corresponding to the final batch have been supplied. If sensor LS2 turns ON before the timer counts up the set period, the controller unit C then decides that the objective materials corresponding to the normal batch have been supplied (See step 1008 through 1010).

For this purpose, the set period of the timer is set with certain allowance in consideration of the time needed for allowing the amount of the objective material containing in the storage container 3 to eventually reach the upper limit level after starting with the lower limit level.

When a specific amount of the material corresponding to the normally split batch is supplied to the storage container 3, the operation mode then proceeds to step 1011, in which the controller C turns the feeder 1 OFF to stop the supply of objective materials and closes the valve A(32). In order to securely feed the predetermined amount of the objective materials to the storage container 3 and prevent the valve A from "biting" the materials, the controller unit C governs the timing of closing or opening of valve A and the ON/OFF operations of the feeder 1 at the beginning and the discontinuation of the supply of objective materials during steps 1005, 1006, 1011, and 1012 in relation to each other by allowing each of those control operations to be executed at delayed intervals (see FIG. 7).

In the routine for controlling the transfer of the normally split batch, when valve A is closed in step 1011, nozzle No.1 is activated to cause the pneumatic source to feed pressurized gas to nozzle No.1 through the gas supply tube so that pressurized gas can be delivered to the material transport pipe 5 from this nozzle.

As soon as the supply of pressurized gas starts out, the internal pressure of the storage container 3 rises by the effect of pressurized gas, and then, when the internal pressure reaches the predetermined level, the pressurized gas then feeds the objective materials contained in the storage container 3 into the material transport pipe 5.

During the pneumatic transporting, the objective materials are sequentially fed while being formed into a high density lengthy column when passing through the horizontal upper pipe 5c at an extremely slow speed as shown in FIG. 3. The objective materials thus transferred are decelerated when the materials pass through the elbow-shaped pipe 8 provided at a position just before the collector 6, thus eventually causing the materials to spontaneously fall into the collector 6, namely in the form of nearly free fall( gravitational fall).

In this transporting operation, the controller unit C constantly monitors and assures signals from sensor LS2 which detects the lower limit level of the supplied material. When the signal from sensor LS2 turns ON, then the controller unit C inactivates nozzle No. 1 to stop the transfer of the objective materials, and then causes the exhaust gas releasing valve 17 to open itself in order to complete the operation for controlling the transfer of individual normally split batch.

The controller unit C controls operations of the exhaust gas releasing valve 17 while steps 1014 through 1017 are executed. After causing the exhaust gas releasing valve 17 to open and assuring that pressure P of the pressure gauge 18 is nearly zero, the controller unit C causes the valve 17 to close and proceeds to the control of the following material supply operation. These control operations are carried out while steps 1014 through 1017 are executed.

Thus, the controller unit C sequentially executes operations for transporting of the normally split batches by circulating steps 1005 through 1015. When the timer counts up the predetermined set period, the operation mode then proceeds to step 1018 to execute the routine for controlling the transfer of the final batch material.

Namely, the controller unit C turns the feeder 1 OFF and holds the storage container 3 in the airtight condition by closing valve A, and then, when step 1020 is entered, the controller unit C activates nozzle No. 1 to feed pressurized gas into the material transport pipe 5, and then, as was done for controlling the transfer of the normally split batches, the final batch materials are delivered to collector 6 in high density and at an extremely slow speed, as shown in FIG. 3.

During the routine for controlling the transfer of final batch materials, the controller unit C constantly monitors the state of sensor LS3.

When the signal from sensor LS3 turns OFF and then the signal from sensor LS4 also turns OFF, the controller unit C then assures that the whole amount of the final batch materials have already been delivered from the outlet of the storage container 3 to the material transport pipe 5, and as a result, the controller unit C inactivates nozzle No. 1 and opens the valve 17. These sequential operations are carried out while steps 1021 through 1024 are executed.

Consequently, residual gas inside of the storage container 3 is forcibly discharged through the valve 17, thus allowing the system of the invention to effectively prevent "blow out phenomenon".

Operation for discharging residual gas through exhaust gas releasing valve 17 is executed until the internal pressure of the storage container 3 becomes nearly zero. When the internal pressure of the storage container 3 becomes zero, the exhaust gas releasing valve 17 is closed again. These sequential operations are carried out while steps 1025 and 1026 are executed.

Note that the system control flowchart shown in FIG. 8 refers to the control of the system which provides only the storage container 3 with the exhaust gas releasing valve 17. However, if the material transport pipe 5 is longer, an additional exhaust gas releasing valve may also be installed to an adequate position of the material transport pipe 5 so that pressurized gas can more effectively be discharged from the pipe 5 by allowing the additional valve to open itself together with valve 17 mentioned above.

After opening the exhaust gas releasing valve in this manner, the transport plug 14 shown in FIGS. 4 (a) through (c) is then inserted into the material transport pipe 5 after removing the lid plug 19 from the projection 5d of the transport pipe 5. The transport plug 14 may be inserted into the material transport pipe 5 by applying manual or automatic means from the openings of the projection 5.

Figure 5:
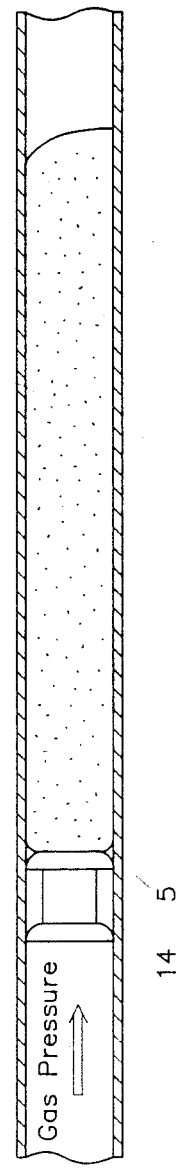
FIG. 5 illustrates the operation of the transport plug employed in the invention.

After completing the insertion of the transport plug 14 from the projection 5d into the pipe 5, the lid plug 19 is closed, and then the system activates nozzle No. 2 so that the transport plug 14 can be carried forward by means of pressurized gas. As a result, as shown in FIG. 5, the transport plug 14 moves forward inside of the material transport pipe 5 in the manner of forcibly pushing materials P remaining inside of the pipe 5 until it is eventually caught by collector 6 together with the transferred materials P.

As soon as the signal from sensor LS5 turns ON while the transport plug 14 is carried forward, the controller unit C inactivates the operation of nozzle No. 2, thus eventually completing the routine for controlling the transfer of the final batch materials. These sequential operations are carried out while steps 1028 through 1030 are executed.

Figure 9:
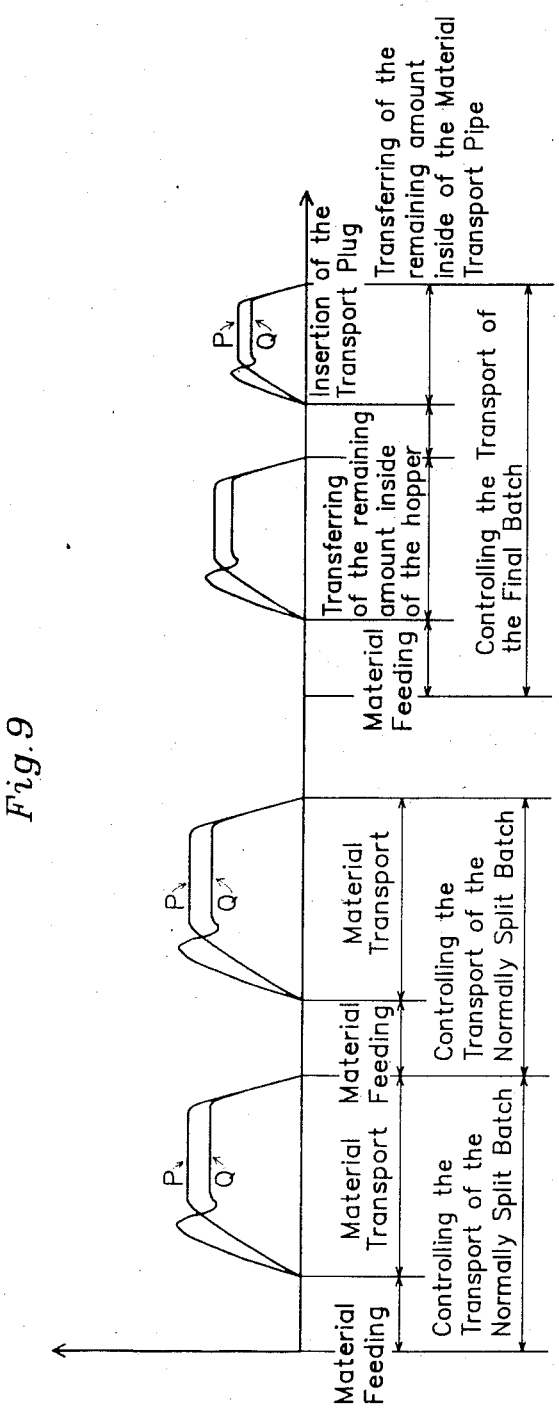
FIG. 9 is a timing chart explaining the relationship between the internal pressure of the storage container and varying wind volume when controlling the system operations related to the method of the invention.
Figure 10:
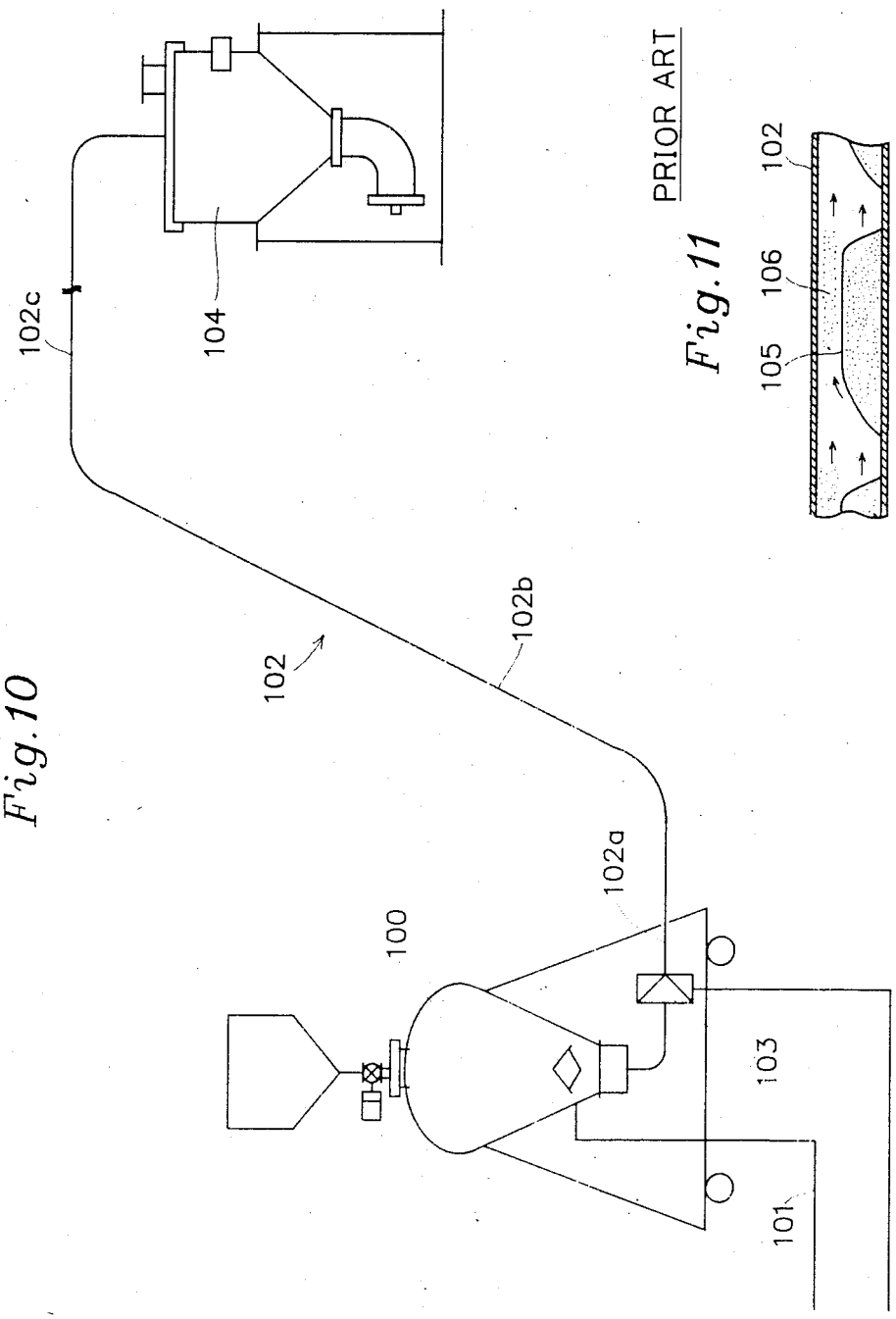
FIG. 10 illustrates a typical constitution of a conventional system for pneumatically transporting powdered or granular materials.
Figure 11:
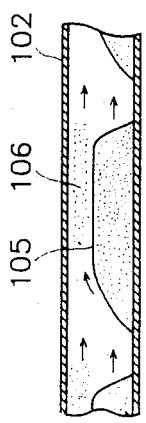
FIG. 11 is a sectional view illustrating how the materials formed into a plug are transported in a horizontal upper pipe related to the conventional system.
Figure 12:
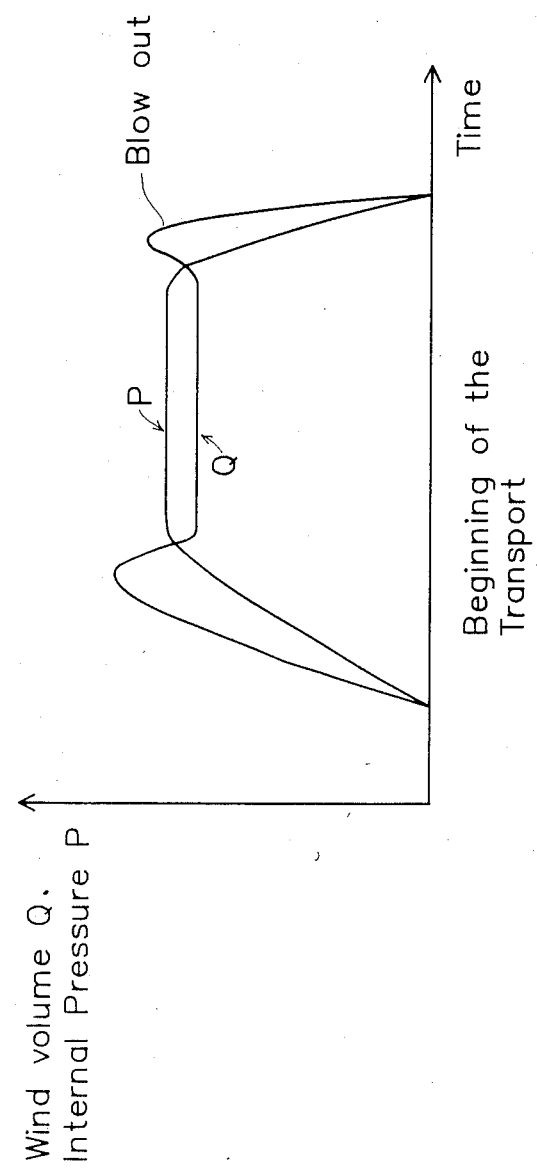
FIG. 12 is a chart explaining the relationship between the internal pressure of the storage container and varying wind volume when pneumatically transporting the materials corresponding to the final batch in a conventional system.

FIG. 9 illustrates variations of the internal pressure P of the storage container 3 and the wind volume Q when executing the transfer of the normally split batches materials and the final batch materials under the pneumatic transporting system of the invention.

It will be apparent from these comparative charts that the wind volume Q is effectively prevented increasing itself when completing the transfer of the final batch materials, thus effectively preventing "blow-out phenomenon".

Since the method of pneumatically transporting the predetermined amount of the objective materials related to the invention aims at thoroughly preventing "blow-out-phenomenon" and removing residual materials at the time of completing the transfer of the final batch materials, any other substitutive means may also be employed for transporting one batch material through the material transport pipe.

In the preferred embodiment described above, powder or granular materials (or tablets cited above) are formed into a high density lengthy column on the way of transferring one batch materials through the horizontal upper pipe 5c.

It should be understood however that the spirit and scope of the invention are not confined themselves merely to the preferred embodiment cited above, but the invention also includes the system using a transport plug for forming the materials into a high density lengthy column when executes normally split batches transport.

As is clear from the foregoing description, since the method and system of the invention securely prevents "blow-out phenomenon" at the time of completing the transfer of the final batch materials, and yet, since even the slightest amount of the residual materials can thoroughly be pushed out of the material transport pipe by means of the transport plug inserted thereunto, the whole amount can safely be delivered to collector from the storage container without incurring chipping, crack or segregation.

Consequently, the method and the system of the invention can effectively and safely be used for pneumatically transporting valuable powder or granular material by thoroughly overcoming all the problems inherent to any of the conventional systems.

Therefore, the method and the system of the invention is suited for pneumatically transporting medicine tablets which are demanded for high quality during production and compression moldings of specified shape.

Furthermore, according to the invention, the objective materials automatically transported by allowing the controller unit to constantly monitor and confirm the state of the signals from sensor means, therefore when the system of the invention is effectively combined together with the material supply facilities, the manufacturing process and the transferring process of valuable material like medicine tablets for example can fully be executed under unmanned factory automation system, and consequently, the present invention securely provides industries with more substantial profit potentials.

What is claimed is:

1. A high density pneumatic transport method of pneumatically transporting powdered or granular materials stored in an airtight storage container to a collector through a transport pipe having a base end, by the use of pressurized gas, comprising the steps of:
- sequentially feeding a predetermined amount of powdered or granular materials fed from a material supply station into the airtight storage container while splitting the materials into a plurality of batches which are composed of a plurality of normal batches and one final batch;
- feeding pressurized gas into the storage container while maintaining an airtight condition so as to deliver the materials contained in the storage container into the transport pipe;
- stopping feeding of the pressurized gas when the whole of the powdered or granular materials corresponding to the final batch contained in the storage container are delivered into the material transport pipe;
- simultaneously discharging the internal pressure of the storage container through a gas decompressing means;
- inserting a transport plug from the base end of the material transport pipe into the transport pipe; and
- carrying forward the transport plug at a slow speed together with the materials remaining in the transport pipe to said collector through the transport pipe by feeding pressurized gas from the base end of the transport pipe into the transport pipe.

2. A high density pneumatic transport system for pneumatically transporting powdered or granular materials stored in an airtight storage container to a collector through a material transport pipe by use of pressurized gas, comprising:
- said airtight storage container having an outlet and provided with a pair of sensors, one of the sensors being adapted to detect an upper limit level of the materials contained in the storage container, and the other of the sensors being adapted to detect a lower limit level of the materials contained in the storage container;
- a material feeding means for sequentially feeding the materials from a material supply station into said storage container while splitting the materials into a plurality of batches;
- said material transport pipe having a base end;
- said collector receiving said material and being connected to said storage container through the material transport pipe;
- a pair of sensors for detecting the existence of the materials contained in the storage container, one of the sensors being installed in a position below the lower limit level, and the other of the sensors being installed in a position at the base end of the material transport pipe close to the outlet of said storage container;
- a transport plug adapted to be inclose contact with the inner surface of said material transport pipe and to be inserted into the base end of the material transport pipe;
- a decompressing means for discharging a pressurized gas charge in the storage container;
- a gas supply means for feeding pressurized gas into the base end of the material transport pipe so as to pneumatically transport the materials delivered into the transport pipe and to carry forward said transport plug; and
- a controller unit for controlling the gas supply means, the material supply means, and the gas decompression means in response to detection signals from the sensors.

* * * * *